United States Patent
Le Blanc

(10) Patent No.: US 10,464,644 B2
(45) Date of Patent: Nov. 5, 2019

(54) SYSTEM AND METHOD FOR MARINE SURVEY PAYLOAD DELIVERY

(71) Applicant: PGS Geophysical AS, Oslo (NO)

(72) Inventor: Pascal Le Blanc, Oslo (NO)

(73) Assignee: PGS Geophysical AS, Oslo (NO)

(*) Notice: Subject to any disclaimer, the term of this patent is extended or adjusted under 35 U.S.C. 154(b) by 0 days.

(21) Appl. No.: 15/476,567

(22) Filed: Mar. 31, 2017

(65) Prior Publication Data

US 2017/0297666 A1 Oct. 19, 2017

Related U.S. Application Data

(60) Provisional application No. 62/324,435, filed on Apr. 19, 2016.

(51) Int. Cl.
| | | |
|---|---|---|
| *B63G 8/14* | (2006.01) | |
| *B63G 8/00* | (2006.01) | |
| *B63G 8/42* | (2006.01) | |
| *B63B 21/66* | (2006.01) | |
| *G01V 13/00* | (2006.01) | |

(52) U.S. Cl.
CPC ............. *B63G 8/14* (2013.01); *B63B 21/663* (2013.01); *B63G 8/001* (2013.01); *B63G 8/42* (2013.01); *B63B 2211/02* (2013.01); *B63G 2008/007* (2013.01); *B63G 2008/008* (2013.01); *G01V 13/00* (2013.01)

(58) Field of Classification Search
CPC . B63G 8/14; B63G 8/42; B63G 8/001; B63G 2008/008; B63G 2008/007; B63B 21/663; B63B 2211/02
See application file for complete search history.

(56) References Cited

U.S. PATENT DOCUMENTS

| | | | | |
|---|---|---|---|---|
| 4,721,055 A | * | 1/1988 | Pado | ....................... B63C 11/52 |
| | | | | 114/330 |
| 6,230,840 B1 | | 5/2001 | Ambs | |

(Continued)

FOREIGN PATENT DOCUMENTS

| | | |
|---|---|---|
| EP | 3239036 A1 | 11/2017 |
| EP | 2364143 A1 | 1/2018 |

(Continued)

OTHER PUBLICATIONS

Remotely Operated Towed Vehicles: https://ocean-innovations.net/companies/bellamare/tow-bodies/remotely-operated-towed-vehicles-rotvs/, retrieved from the internet on Jan. 23, 2019. (Year: 2019).*

(Continued)

*Primary Examiner* — Anthony D Wiest

(57) ABSTRACT

An apparatus. The apparatus includes a body and a plurality of control surfaces attached to the body. A first control surface is configured to control an ascent and descent of the apparatus, responsive to ascent/descent control information. A second control surface is configured to control a roll of the apparatus responsive to roll control information, and a third control surface is configured to control a yaw of the apparatus responsive to yaw control information. The apparatus further includes a releasable first docking fixture attached to the body, the first docking fixture configured to engage a second docking fixture on a payload.

9 Claims, 5 Drawing Sheets

(56) References Cited

U.S. PATENT DOCUMENTS

| | | | |
|---|---|---|---|
| 7,131,389 B1* | 11/2006 | Hawkes | B63G 8/001 |
| | | | 114/330 |
| 7,409,919 B2 | 8/2008 | Hoogeveen et al. | |
| 7,721,669 B1* | 5/2010 | Portmann | B63G 8/42 |
| | | | 114/322 |
| 7,754,018 B2 | 7/2010 | Lepage et al. | |
| 8,514,664 B2 | 8/2013 | Harrick et al. | |
| 8,847,722 B2 | 9/2014 | Li et al. | |
| 8,960,117 B2 | 2/2015 | Nielsen et al. | |
| 9,126,661 B2 | 9/2015 | McKey, III | |
| 9,207,346 B2 | 12/2015 | Turnbull | |
| 9,372,280 B2 | 6/2016 | Juhasz et al. | |
| 9,488,753 B2 | 11/2016 | Bassett | |
| 9,696,449 B2 | 7/2017 | Juhasz et al. | |
| 9,709,689 B2 | 7/2017 | Harrick | |
| 2004/0051316 A1 | 3/2004 | Spears | |
| 2009/0217946 A1 | 9/2009 | Anthony | |
| 2010/0212573 A1* | 8/2010 | Hawkes | B63B 22/24 |
| | | | 114/328 |
| 2011/0174207 A1 | 7/2011 | Harrick et al. | |
| 2011/0255369 A1 | 10/2011 | Harrick et al. | |
| 2013/0187655 A1 | 7/2013 | Juhasz et al. | |
| 2014/0016434 A1 | 1/2014 | Turnbull | |
| 2014/0069313 A1 | 3/2014 | Nielsen et al. | |
| 2014/0338699 A1 | 11/2014 | Bassett | |
| 2015/0226869 A1 | 8/2015 | Harrick | |
| 2015/0285949 A1 | 10/2015 | Macquin et al. | |
| 2016/0306067 A1 | 10/2016 | Juhasz et al. | |
| 2017/0235017 A1 | 8/2017 | Vasbo et al. | |
| 2017/0285199 A1 | 10/2017 | Harrick | |
| 2017/0297666 A1 | 10/2017 | Le Blanc | |

FOREIGN PATENT DOCUMENTS

| | | |
|---|---|---|
| GB | 2493452 A | 2/2013 |
| GB | 2505778 A | 3/2014 |
| GB | 2521465 A | 6/2015 |
| JP | H04276908 A | 10/1992 |
| JP | H06166397 A | 6/1994 |
| NO | 334064 B1 | 6/2005 |
| NO | 336205 B1 | 6/2005 |

OTHER PUBLICATIONS

ROTVs Brochure, http://bluecoat-06.uspto.gov/?cfru=aHR0cDovL 29jZWFuLWlubm92YXRpb25zLm5ldC9PY2Vhbklubm92YXRpb 25zTkVXL2JlbGxhbWFyZS9ST1RWcy5wZGY=, retreived from the internet on Jan. 23, 2019, however ROTVs Brochure was created on Jul. 27, 2012 (Year: 2012).*

Extended European Search Report for corresponding European application No. 17166933.6-1751, dated Oct. 5, 2017, 8 pages.

Tonnessen, R. et al., "Focus on Operational Efficiency and Crew Safety—Introducing Advanced ROV Technology in Marine Towed Streamer Seismic," 2016 EAGE (European Association of Geoscientists & Engineers) Conference and Exhibition, May 2016, 5 pages.

Examination Report dated Jun. 29, 2018 in European Patent Application No. 17166933.6 filed Apr. 18, 2017; 9 pages.

Extended Search Report in European Patent Application No. 18158347.7; dated Aug. 6, 2018; 7 pages.

* cited by examiner

SYSTEM AND METHOD FOR MARINE SURVEY PAYLOAD DELIVERY

CROSS-REFERENCE TO RELATED APPLICATIONS

This application claims the benefit of U.S. Provisional Application Ser. No. 62/324,435 filed Apr. 19, 2016 and titled "Laterally and Vertically Steerable Marine Depressor". The provisional application is incorporated by reference herein as if reproduced in full below.

BACKGROUND

Marine survey systems are used to acquire data (e.g., seismic, electromagnetic) regarding Earth formations below a body of water such as a lake or ocean. The marine survey systems comprise a complex array of buoys, lines, and paravane systems and streamers towed behind the survey vessel. The streamers comprise various sensors to detect seismic or electromagnetic signals, as the case may be, reflected from the formations. Other equipment may also be deployed in conjunction with a seismic survey such as acoustic and electromagnetic sources.

To maintain the equipment, it may be advantageous to deliver a payload to the equipment while under tow. For example, to maintain the streamers, a streamer cleaning device may be used. Apparatus and methods to deploy a payload such as the streamer cleaning device at operational depth and speed would provide a competitive advantage in the marketplace.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
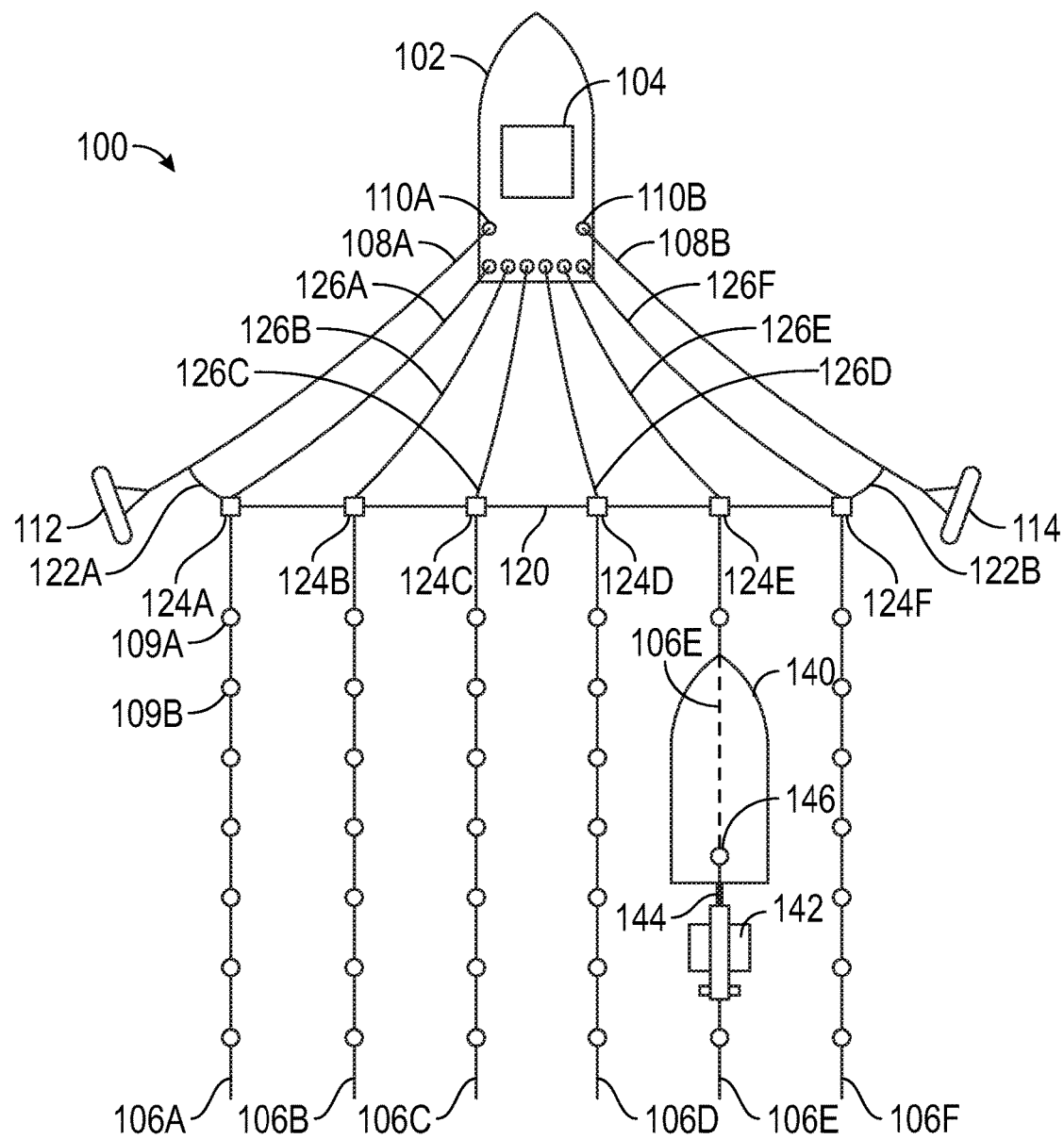
FIG. 1 shows an overhead view of a marine survey in accordance with at least some embodiments.

FIG. 1 shows an overhead view of a marine survey system 100 in accordance with at least some embodiments. In particular, FIG. 1 shows a survey vessel 102 having onboard equipment 104, such as navigation, energy source control, and data recording equipment. Survey vessel 102 is configured to tow one or more sensor streamers 106A-F through the water. While FIG. 1 illustratively shows six streamers 106, any number of streamers 106 may be equivalently used.

The streamers 106 are coupled to towing equipment that maintains the streamers 106 at selected lateral positions with respect to each other and with respect to the survey vessel 102. The towing equipment may comprise two paravane tow lines 108A and 108B each coupled to the vessel 102 by way of winches 110A and 110B, respectively. The winches enable changing the deployed length of each paravane tow line 108. The second end of paravane tow line 108A is coupled to a paravane 112, and the second end of paravane tow line 108B is coupled to paravane 114. In each case, the tow lines 108A and 108B couple to their respective paravanes through respective sets of lines called a "bridle". The paravanes 112 and 114 are each configured to provide a lateral force component to the various elements of the survey system when the paravanes are towed in the water. The combined lateral forces of the paravanes 112 and 114 separate the paravanes from each other until the paravanes put one or more spreader lines 120, coupled between the paravanes 112 and 114, into tension. The paravanes 112 and 114 either couple directly to the spreader line 120, or as illustrated couple to the spreader line by way of spur lines 122A and 122B The streamers 106 are each coupled, at the ends nearest the vessel 102 (i.e., the proximal ends) to a respective lead-in cable termination 124A-F. The lead-in cable terminations 124 are coupled to or are associated with the spreader lines 120 so as to control the lateral positions of the streamers 106 with respect to each other and with respect to the vessel 102. Electrical and/or optical connections between the appropriate components in the recording system 104 and the sensors (e.g., 109A, 109B) in the streamers 106 may be made using inner lead-in cables 126A-F. Much like the tow lines 108 associated with respective winches 110, each of the lead-in cables 126 may be deployed by a respective winch or similar spooling device such that the deployed length of each lead-in cable 126 can be changed.

A chase boat 140 towing a steerable depressor 142 via an umbilical 144 suspended from a derrick 146 may be used to transfer a payload attached beneath the steerable depressor 142 (not visible in FIG. 1) to an apparatus while under tow, as will be described further in conjunction with FIGS. 2-5.

Figure 2:
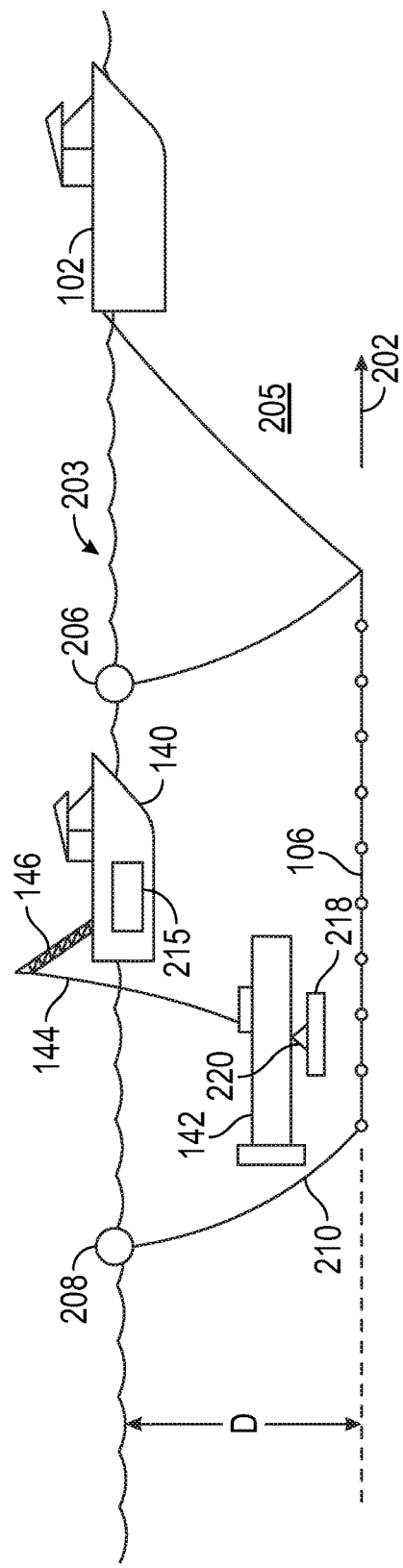
FIG. 2 shows a side elevation view of marine survey in accordance with at least some embodiments.

FIG. 2 shows a side elevation view of a streamer 106 in an operational configuration. In particular, FIG. 2 shows a streamer 106 being towed in a direction indicated by arrow 202 by tow vessel 102. In some embodiments, the forward portion of the streamer may be associated with a lead buoy 206, where lead buoy 206 may help maintain the depth of the streamer 106 and/or associated portion of the spreader line; however, in other cases the lead buoy 202 may be omitted, or other buoys (e.g., buoys associated with the spreader line 120 (not shown in FIG. 2) may perform similar functions. Although the streamer harness or bridle arrangement of FIG. 1 has been described for illustrative purposes, other arrangements may be used without deviating from the scope of the invention as described and claimed below. FIG. 2 also illustrates related-art use of a tail buoy 208. Tail buoy 208 may couple to the distal end of the sensor streamer 106 by any suitable mechanism, such as line 210, sometimes referred as a "dead section". In some cases, tail buoy 208 may ride along the surface 203 of the water during the marine geophysical survey and at least partially support the sensor streamer 106 at the selected depth D below the surface 203 of a water body 205. Between the proximal end of the sensor streamer 106 and the distal end of the sensor streamer 106, the streamer positioning devices (such as depth and/or lateral position controllers) may help with localized depth control of the sensor streamer FIG. 2 also shows the steerable depressor 142 suspended within water body 205 via the umbilical 144 from a derrick 146 on board chase boat 140 as described in conjunction with FIG. 1. Chase boat 140 also proceeds in direction 202 behind tow vessel such that a payload 218, deployed beneath steerable depressor 142, may be transferred to another towed apparatus while both the steerable depressor with payload attached and the other apparatus are towed at speed. With a streamer cleaning device as an exemplary payload 218, the streamer cleaning device may be positioned on a streamer 106 by maneuvering steerable depressor 142, as described further below. A streamer cleaning device or other payload may be deployed beneath steerable depressor 142 via a releasable docking fixture 220. Releasable docking fixture 220 may be configured to engage a mating docking fixture on the payload to be transferred, as described further below. A controller 215 on board chase boat 140 may be configured to send control signals via umbilical 144 to steerable depressor 142. For example, docking fixture 220 may be configured to release a payload responsive to control information received via the umbilical 144. In at least some embodiments, the control information may be received by a control system (not shown in FIG. 2) in steerable depressor 142, as described further below. Umbilical 144 may also carry electrical power from chase boat 140 to the steerable depressor 142.

Figure 3A:
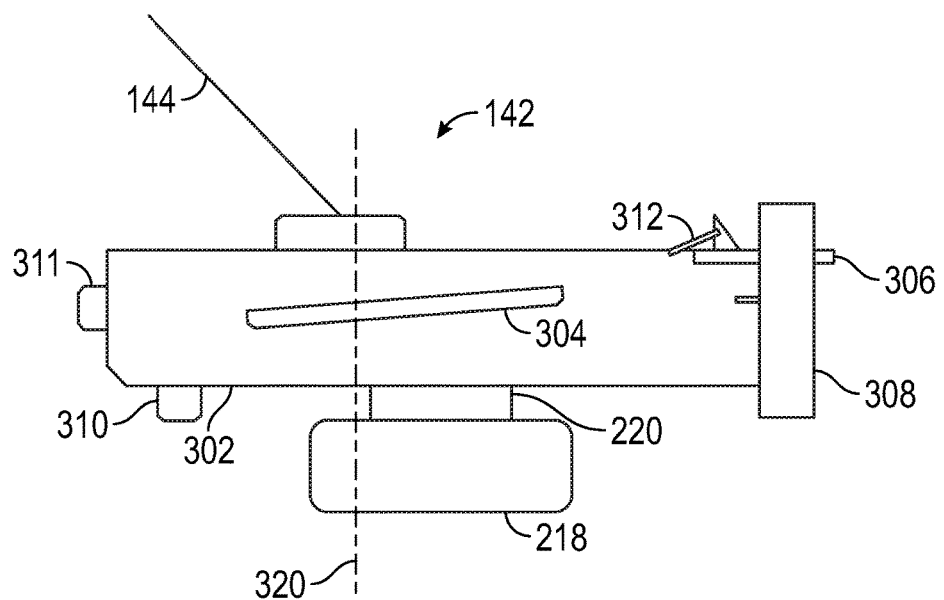
FIG. 3A shows a side elevation view of a steerable depressor in accordance with some embodiments.
Figure 3B:
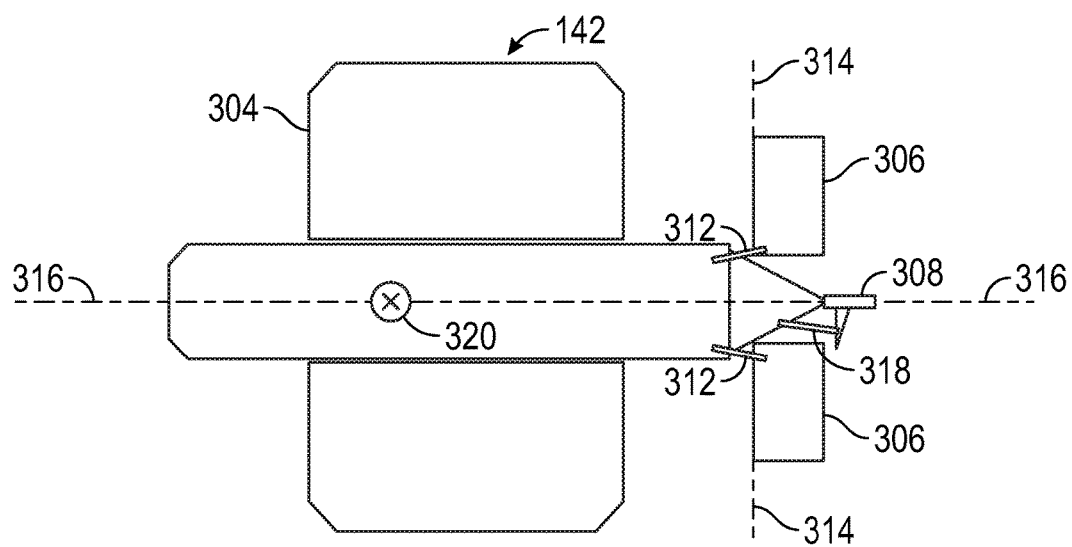
FIG. 3B shows a top view of a steerable depressor in accordance with some embodiments

Turning now to FIGS. 3A and 3B, a steerable depressor 142 in accordance with at least some embodiments is shown in a side elevation and top view, respectively. Steerable depressor 142 includes a body 302 which may provide a support for various control surfaces, and their corresponding actuators, drive mechanisms and control systems therefor. Body 302 may be in the form of a hull as shown in FIG. 3A, 3B or alternatively, may take other forms such as an open frame structure fabricated from tubing, for example.

Steerable depressor 142 includes a plurality of control surfaces that are moveable so as to control the motion thereof as it is towed within the water body. The plurality of control surfaces may be attached to body 302, as described further below. A control system for the operating the control surfaces may be provided as described in conjunction with FIG. 4 below. Wings 304 provide for the control of steerable depressor 142 in a direction substantially perpendicular to the wings. In operation the wings are substantially parallel to a tow direction 202 which itself is substantially parallel to the surface of the water body. Thus, the wings 304 may be used to control an ascent/descent, and thereby, a depth of steerable depressor 142 within the water body 205. As would be appreciated by those skilled in the art having the benefit of the disclosure, the ascent or descent of the steerable depressor 142 in the water body 205 (FIG. 2) may be controlled by varying the angle, a relative to a tow direction 202 (FIG. 2) as the steerable depressor 142 is towed through the water body 205. The ascent and descent, as the case may be, may be responsive to corresponding ascent/descent control information from the controller 215 (FIG. 2) in the control signals transmitted via umbilical 144.

Ailerons 306 operate in tandem to control the roll of the steerable depressor 142. Roll of the steerable depressor may also be responsive to corresponding roll control information from the controller 215 (FIG. 2) in the control signals transmitted via umbilical 144.

Rudder 308 controls the yaw of the steerable depressor 142. The adjustment of the yaw may also be responsive to corresponding yaw control information from the controller 215 conveyed via signals in umbilical 144. Using the example of a payload comprising a streamer cleaning device, an operator on the surface, located in chase boat 140, say, may maneuver the steerable depressor so as to align the payload 218 (the streamer cleaning device) with a streamer cable 106 (not shown in FIGS. 3A, 3B). The operator would cause, via inputs to a controller, e.g. a controller 215 (FIG. 2) via a joystick, for example, the rudder 308 to adjust the yaw of the steerable depressor 142 such that payload 318 (the streamer cleaning device) is parallel to the streamer cable 106. Further, steerable depressor 142 may mount one or more video cameras 310 to provide visual cues to the operator. Video signals from the video cameras 310 may be communicated to the surface via umbilical 144 which may then be received and displayed by controller 215, for example, as further described below. Further, a sonar unit 311 may provide additional navigational information to the remote operator. Sonar data may also be communicated to the remote operator via umbilical 144.

A plurality of actuators coupled to respective control surfaces may be used to move the control surfaces responsive to corresponding control information received at the steerable depressor 142 via umbilical 144. Actuators 312 link to ailerons 306. The actuators 312, responsive to control signals from the controller 215 (FIG. 2) at the surface and the control system disposed within or on steerable depressor 142 (not shown in FIGS. 3A, 3B), described further below, cause the ailerons to rotate in opposite directions about an axis 314. In this way, steerable depressor 142 may be caused to roll about an axis 316 (shown only in FIG. 3B for simplicity of illustration) which is perpendicular to the axis 314.

Actuator 318 links to rudder 308. Responsive to control signals from the controller 215 and the control system disposed within or on steerable depressor 142 (not shown in FIGS. 3A, 3B), the actuator 318 causes rudder 308 to deflect to the right or left as the case may be, accordingly, steerable depressor 142 may be caused to yaw about an axis 320 which may be mutually perpendicular to axes 314 and 316.

Additionally, an actuator (not visible in FIG. 3) may be linked to wings 304 to motivate them and control the angle, a, to affect the ascent or descent of steerable depressor 142, as the case may be.

As would be appreciated by those skilled in the art having the benefit of the disclosure, the aforesaid control responses of the steerable depressor are induced by the hydrodynamic forces arising from the fluid flow over the various control surfaces. The fluid flow in turn arises from the towing of the steerable depressor through the water body, as described in conjunction with FIG. 2. Thus, steerable depressor 142 provides an apparatus to deliver a payload from a vessel, an streamer cleaning device being one example, to a sensor streamer or other device within or beneath the water body, at speed. Stated differently, a steerable depressor 142 provides a mechanism to deliver a payload to an apparatus within or on the surface of a water body without having to curtail a survey tow operation.

Figure 4:
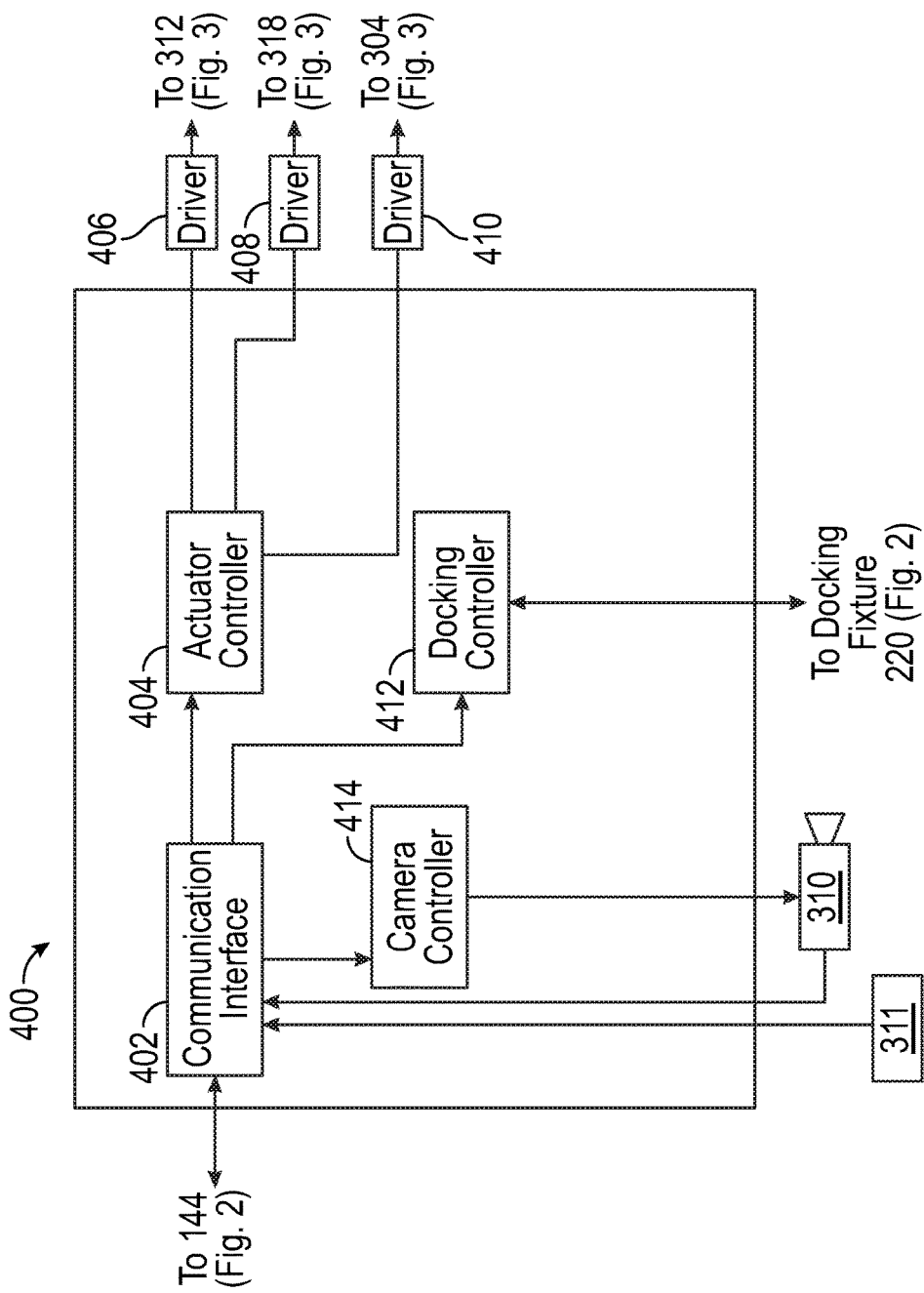
FIG. 4 shows a block diagram of a control system in accordance with some embodiments.

FIG. 4 illustrates a block diagram of a control system 400 in accordance with at least some embodiments. Control system 400 may be implemented using one or more embedded CPUs and associated firmware, one or more application-specific integrated circuits, field-programmable gate arrays and the like, and combinations thereof. Control system 400 may be disposed on or within a body 302 of a steerable depressor 142 depending on the form of body 302. For example, for a body 302 comprising a hull, control system 400 may be disposed within the hull. Control system 400 may be configured to operate the plurality of actuators corresponding to ailerons 306, rudder 308 and wings 304 as described above. Control system 400 may be coupled to a controller, e.g. controller 215 (FIG. 2) at the surface via umbilical 144 and communicate therewith over one or more communication channels, which may comprise any suitable communication protocol. Further, the physical link may be either electrical or optical or both, for example. A communication interface 402 may be provided to modulate and demodulate the communication signals as necessary to recover the control information sent from the controller at the surface. Communication interface 402 may also demultiplex the control information directed to the different actuators but which are multiplexed onto a single communication channel. Further, communication interface 402 may be coupled to video camera 310 and sonar unit 311 to intermediate communication between those devices and a remote operator on the surface via umbilical 314, by for example, encoding data from those devices in accordance with a preselected communication protocol based on the physical medium comprising the communication channels in umbilical 314. As would be appreciated by those skilled in the art having the benefit of the disclosure, various communication protocols may be defined based on the type of communication medium, e.g. electrical, optical and the like, and the principles of the disclosure do not implicate a particular communication medium, and may be embodied in any suitable communication medium and its corresponding protocol.

As required by a particular communication protocol, communication interface 402 may demodulate and demultiplex the control information in the control signals received via umbilical 144 (FIG. 2) and the resulting control information forwarded to actuator controller 404. Actuator controller 404 is coupled to drivers 406, 408 which are associated with and motivate a corresponding one of actuators 312 and 318 (FIG. 3). Additionally, a driver 410 may be associated with moveable wings 304 (FIG. 3) to motivate the wings as described above. Drivers 406, 408, 410 may comprise electromechanical devices such as electric motors, stepper motors, linear positioners and the like. The actuator controller 404 may send control signals to the drivers based on the control information and each driver configured to set the position of the corresponding actuator responsive to a corresponding one of the control signals. Position sensors may be used in conjunction with electromechanical devices having continuous motion in a feedback loop within actuator controller 404, for example, to maintain the desired position of the respective control surfaces.

Control system 400 may also include a docking controller 412 coupled to a docking fixture 220 (FIG. 2) on a steerable depressor 142. Responsive to docking control information from the surface communicated via the umbilical 144, docking controller may send a signal to the docking fixture 220 to open the docking fixture 220 and release the payload 218. For example, if the payload comprises a streamer cleaning device, once the streamer cleaning device is delivered to the streamer to be cleaned, the steerable depressor may be commanded to release the streamer cleaning device. Conversely, once the cleaning operation is completed, the steerable depressor 142 may be maneuvered to recover the streamer cleaning device by engaging a docking fixture on the streamer cleaned and commanding the docking fixture on the steerable depressor to latch via a signal to the docking fixture based on control information received via the umbilical 144.

Further, control system 400 may include a camera controller 414 coupled to the one or more cameras 310 to control the operation of the cameras 310. For example, responsive to control information communicated from the surface via umbilical 144 (FIG. 2), one or more of the viewing position, focus and zoom of the cameras 310 may be controlled. Similar to the control information for controlling the motion of the steerable depressor, the control information for controlling the cameras 310 may be demodulated and/or demultiplexed and communicated to the camera controller 414 which generates corresponding camera control signals based on the control protocols of the cameras 310.

Figure 5:
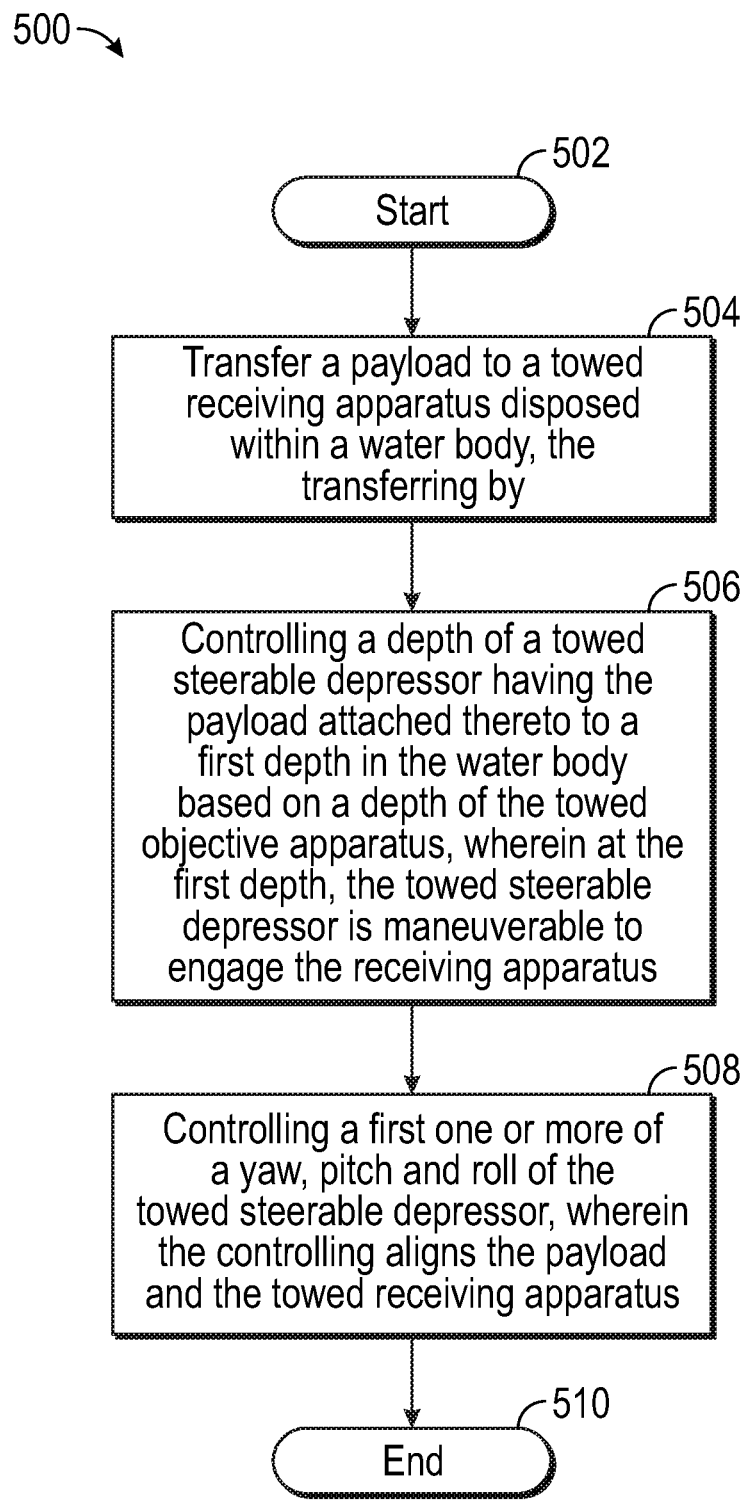
FIG. 5 shows a flow chart of a method in accordance with some embodiments.

Turning now to FIG. 5, FIG. 5 shows a flowchart of a method 500 in accordance with at least some embodiments. Method 500 starts at block 502. In block 504, a payload is transferred to a towed apparatus disposed within a water body. The towed apparatus may be any device, apparatus or equipment to which a payload is to be delivered. For example, a sensor streamer may be the receiving apparatus for the transfer of a streamer cleaning device. The transferring at block 504 is by controlling a depth of a towed of a towed steerable depressor having the payload attached thereto to a first depth in the water body based on the towed receiving apparatus, wherein at the first depth the towed steerable depressor is maneuverable to engage the receiving apparatus (block 506). The transferring, at block 502 is further by controlling a first one or more of a yaw, pitch and roll of the towed steerable depressor, wherein the controlling aligns the payload and the towed receiving apparatus (block 508). Thus, for example, at the first depth, the one or more cameras 310 (FIGS. 3A, 4) may view the apparatus to receive the transferred payload such that an operator at the surface may maneuver the towed steerable depressor with the payload attached, using visual cues. These may be displayed by display device associated with a controller 215 (FIG. 2), for example. The visual cues may assist the operator to adjust one or more of the yaw, pitch and roll of the towed steerable depressor as needed to align the payload and the receiving apparatus. As described above, the yaw, pitch and roll of the steerable depressor may be responsive to control information from a controller, e.g. a controller 215, on a vessel deployed at a surface of the water body wherein the control information is transmitted to the steerable depressor via an umbilical disposed between the steerable depressor and the vessel. Note that the transfer may occur at speed, that is with the tow underway, with the speed of the towed steerable depressor matching speed of the towed receiving apparatus. Method 500 ends at block 510.

Further, the depth of the towed steerable depressor may be controlled from the first depth to a second depth using visual cues, say, such that the payload engages with the towed receiving apparatus. Again using a streamer cleaning device as an exemplary payload, a descent of the steerable depressor from the first depth to a second depth below the first depth in the water body, may be controlled wherein, at the second depth, a streamer engagement mechanism on the streamer cleaning device engages the sensor streamer. The steerable depressor may then be released from the streamer cleaning device, as previously described. Once the payload is delivered, the steerable depressor may be controlled to ascend through the water body to return the steerable depressor to the surface, say.

Further still, the streamer cleaning device may be retrieved. Retrieving the streamer cleaning device may include: controlling a descent of the steerable depressor through the water body to the first depth of streamer in the water body, and controlling a second one or more of a yaw, pitch and roll of the steerable depressor, and controlling a second one or more of a yaw, pitch and roll of the steerable depressor, wherein, responsive to the controlling, a first docking fixture on the steerable depressor is aligned with a second docking fixture on the streamer cleaning device. The descent of the steerable depressor may be further controlled until the first docking feature engages the second docking feature. Similar to the controlled descent described above in conjunction with the transfer of the payload, here the streamer cleaning device, the descent from the first to the second depth may be visually aided by video from the cameras 310 (FIGS. 3A, 4). Once engaged the docking fixtures may be locked to secure the streamer cleaning device to the steerable depressor. The steerable depressor may then be returned to the surface as before, but with the streamer cleaning device attached thereto.

The above discussion is meant to be illustrative of the principles and various embodiments of the present invention. Numerous variations and modifications will become apparent to those skilled in the art once the above disclosure is fully appreciated. For example, various physical communications channels, communications protocols and encoding schemes may be used in conjunction with the disclosed embodiments. It is intended that the following claims be interpreted to embrace all such variations and modifications

What is claimed is:

1. A method comprising:
    towing, within a water body, a towed steerable depressor having a streamer cleaning device releasably attached thereto, the towing by way of an umbilical coupled to the towed steerable depressor such that forward motion of the towed steerable depressor is imparted by the umbilical;
    controlling a depth of the towed steerable depressor to a first depth in the water body based on a depth of a sensor streamer, wherein at the first depth, the towed steerable depressor is maneuverable to engage the sensor streamer;
    controlling a first one or more of a yaw, pitch and roll of the towed steerable depressor, wherein the controlling aligns the streamer cleaning device and the sensor streamer; and
    transferring a streamer cleaning device to a sensor streamer disposed within a water body.

2. The method of claim 1 wherein a speed of the towed steerable depressor matches a speed of the sensor streamer.

3. The method of claim 1 wherein the method comprising further controlling a descent of the steerable depressor from the first depth to a second depth below the first depth in the water body, wherein, at the second depth, a streamer engagement mechanism on the streamer cleaning device engages the sensor streamer.

4. The method of claim 3 further comprising releasing the steerable depressor from the streamer cleaning device.

5. The method of claim 4 further comprising controlling an ascent of the steerable depressor to return the steerable depressor to a surface of the water body.

6. The method of claim 4 further comprising:
    retrieving the streamer cleaning device by:
        controlling a descent of the steerable depressor through the water body to the first depth of streamer in the water body;
        controlling a second one or more of a yaw, pitch and roll of the steerable depressor, wherein, responsive to the controlling, a first docking fixture on the steerable depressor is aligned with a second docking fixture on the streamer cleaning device.

7. The method of claim 6 comprising further controlling the descent of the steerable depressor until the first docking fixture engages the second docking fixture.

8. The method of claim 6 further comprising locking the first and second docking fixtures together.

9. The method of claim 1 wherein the controlling a first one of a yaw, pitch and roll of the steerable depressor is responsive to a control signal from a controller on a vessel deployed at a surface of the water body, the control signal transmitted to the steerable depressor via an umbilical disposed between the steerable depressor and the vessel.

* * * * *